(12) United States Patent
Lee et al.

(10) Patent No.: US 10,534,662 B2
(45) Date of Patent: *Jan. 14, 2020

(54) EQUIPMENT FAILURE RISK DETECTION AND PREDICTION IN INDUSTRIAL PROCESS

(71) Applicant: International Business Machines Corporation, Armonk, NY (US)

(72) Inventors: Young M. Lee, Old Westbury, NY (US); Nizar Lethif, Kozhikode (IN)

(73) Assignee: International Business Machines Corporation, Armonk, NY (US)

( * ) Notice: Subject to any disclaimer, the term of this patent is extended or adjusted under 35 U.S.C. 154(b) by 57 days.

This patent is subject to a terminal disclaimer.

(21) Appl. No.: 15/977,147

(22) Filed: May 11, 2018

(65) Prior Publication Data

US 2018/0260271 A1    Sep. 13, 2018

Related U.S. Application Data

(63) Continuation of application No. 15/164,083, filed on May 25, 2016, now Pat. No. 10,067,817.

(51) Int. Cl.
*G06F 11/07* (2006.01)
*G06F 11/00* (2006.01)
(Continued)

(52) U.S. Cl.
CPC .......... *G06F 11/0793* (2013.01); *G05B 23/00* (2013.01); *G06F 11/008* (2013.01);
(Continued)

(58) Field of Classification Search
CPC .. G06F 11/008; G06F 11/0709; G06F 11/079; G06F 11/0793; G06F 11/3058
See application file for complete search history.

(56) References Cited

U.S. PATENT DOCUMENTS 6,115,713 A    9/2000 Pascucci et al.
7,065,725 B2    6/2006 Yajima et al.
(Continued)

FOREIGN PATENT DOCUMENTS

WO    2013070873 A1    5/2013
WO    2014005073 A1    1/2014

OTHER PUBLICATIONS

List of IBM Patents or Patent Applications Treated as Related, dated May 11, 2018, 2 pages.

*Primary Examiner* — Joseph R Kudirka
(74) *Attorney, Agent, or Firm* — Scully, Scott, Murphy & Presser, P.C.; Daniel P. Morris, Esq.

(57) ABSTRACT

Detecting equipment failure risk in industrial process may include distributing equipment operations data to a cluster of nodes based on a range of time and operation specified in maintenance data associated with the equipment. From a record entry in the maintenance data, an operation, installation and maintenance time may be determined. A plurality of nodes storing equipment operations data associated with the operation during a time range between the installation and the maintenance time are selected. Operation features may be determined by distributed processing operation in the plurality of nodes. The operation features are aggregated and added as an entry in a target table. Equipment failure risk is detected by risk failure analysis performed based on the target table. A signal may be sent to automatically adjust or correct one or more operation features.

20 Claims, 7 Drawing Sheets

(51) Int. Cl.
*H04L 12/24* (2006.01)
*G05B 23/00* (2006.01)

(52) U.S. Cl.
CPC ........ *G06F 11/079* (2013.01); *H04L 41/0604* (2013.01); *H04L 41/0654* (2013.01); *H04L 41/147* (2013.01)

(56) References Cited

U.S. PATENT DOCUMENTS

| | | |
|---|---|---|
| 8,433,475 B2 | 4/2013 | Corbefin |
| 9,002,691 B2 | 4/2015 | Richards et al. |
| 2006/0259198 A1 | 11/2006 | Brcka et al. |
| 2014/0250153 A1 | 9/2014 | Nixon et al. |
| 2014/0336791 A1 | 11/2014 | Asenjo et al. |

EQUIPMENT FAILURE RISK DETECTION AND PREDICTION IN INDUSTRIAL PROCESS

FIELD

The present application relates generally to computers and distributed processing, and more particularly to distributed parallel processing for determining equipment failure in industrial process.

BACKGROUND

In industrial process or operation such as semiconductor manufacturing and/or chemical processes, equipment failure risk analysis of equipments may be performed as part of a predictive maintenance task. Equipment failure risk analysis, however, may require processing of very large data (Big Data), for example, because each equipment may have been in operations for long duration (e.g., several months or even years), during the operation of an equipment, many operational conditions (features) may have been recorded (e.g., 100 features recorded in every second), and during the operations of an equipment, many products may have been produced and many product features (properties) may have been recorded. Performing analysis on a large data set takes a long time.

BRIEF SUMMARY

A computer-implemented method and system of detecting equipment failure risk in industrial process may be provided. The method, in one aspect, may include distributing, over a computer communication network, equipment operations data to a cluster of nodes participating in parallel processing and storing a distributed file system, the distributing based on a range of time and operation specified in maintenance data associated with the equipment. The method may also include, from a record entry in the maintenance data, determining at least an operation performed by the equipment, an installation time the equipment was installed to operate in the industrial process, and a maintenance time of the equipment. The method may also include determining from the cluster of nodes, a plurality of nodes storing equipment operations data associated with the operation performed by the equipment during a time range between the installation time and the maintenance time. The method may also include constructing a target table based on aggregated operation features determined based on the plurality of nodes executing a distributed processing operation in parallel, the distributed processing operation computing operation features associated with the equipment. The method may also include performing a risk failure analysis of an instance of the equipment based on the aggregated operation features stored in the target table.

A system of detecting equipment failure risk in industrial process, in one aspect, may include at least one hardware processor communicatively coupled to a cluster of nodes storing a distributed file system. The at least one hardware processor may be operable to distribute, over a computer communication network, equipment operations data to the cluster of nodes storing a distributed file system, the distributing based on a range of time and operation specified in maintenance data associated with the equipment. The at least one hardware processor may be further operable to, from a record entry in the maintenance data, determine at least an operation performed by the equipment, an installation time the equipment was installed to operate in the industrial process, and a maintenance time of the equipment. The at least one hardware processor may be further operable to determine from the cluster of nodes, a plurality of nodes storing equipment operations data associated with the operation performed by the equipment during a time range between the installation time and the maintenance time. The at least one hardware processor may be further operable to construct a target table based on aggregated operation features determined based on the plurality of nodes executing a distributed processing operation in parallel, the distributed processing operation computing operation features associated with the equipment. The at least one hardware processor may be further operable to perform risk failure analysis of an instance of the equipment based on the aggregated operation features stored in the target table.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
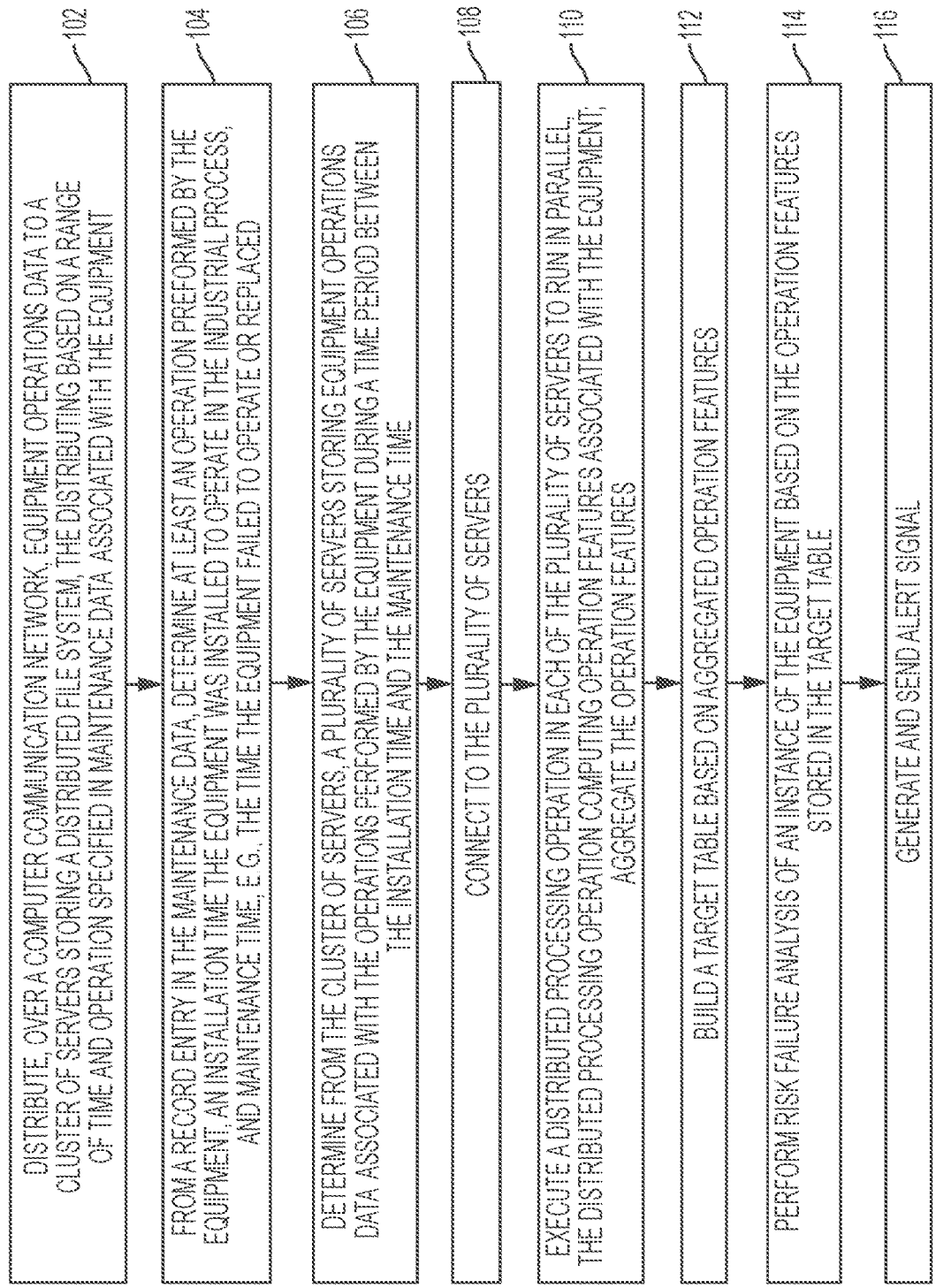
FIG. 1 is a flow diagram illustrating a method of performing equipment failure detection in one embodiment of the present disclosure.

A system, method, computer program product, and/or technique may be provided in one embodiment that implements a Big Data approach to reducing the time for equipment failure risk analysis, for example, in industrial and/or manufacturing operations. Big Data analytics technique in the present disclosure in one embodiment may cluster a process database into multiple nodes (e.g., computer servers) and perform in parallel distributed operations such as MapReduce operations from each node for equipment failure risk analysis. In one embodiment, the operations data and production data may be distributed into multiple nodes in a clustered database based on equipment failure history data and production data. In one embodiment, MapReduce operations may be performed in parallel on the operations data cluster and production data cluster for a plurality of individual maintenance records in a maintenance history database. Based on the MapReduce operations, a target data table may be constructed that contains equipment, lifespan of equipment, operations features and product features for failure risk analysis. Failure risk analysis may be performed based on the target data table.

Equipment failure risk analysis of equipment in industrial manufacturing process or operation (e.g., semiconductor manufacturing, chemical processes) may predict the life expectancy of equipment (assets) so that appropriate maintenance is planned. Such analysis may involve using the maintenance history, e.g., the time of installation and the time of failure and/or replacement for an equipment of interest; Identifying the operating conditions of the process (operational features or variables) when the particular equipment was in operation; Predicting the survival and hazard probability of equipment (assets), such as electrostatic chuck (ESC) in semiconductor manufacturing, over time; and identifying what and how operational features impact the equipment failure. Predicting the survival and hazard probability may include computing survivor and hazard functions. For example, the survivor function computes the probability that the survival time of an individual exceeds a defined value; The hazard function provides the instantaneous failure rate of individual equipment.

Equipment failure risk analysis may be used to compute the optimal (minimum cost) planning of maintenance, for example, compute when to replace and which equipment, for example, schedule maintenance work of ESC of semiconductor fabricating chamber to replace a ESC in X number of days and send the schedule to the asset management tool. Equipment failure risk analysis may be also used to optimally set controllable process variables that extend the life of the equipment. For example, the analysis may be used to compute the desired temperature and pressure of equipment, for example, a particular semiconductor fabricating chamber, for example, as 300 degree Celsius and pressure of 10 standard atmosphere (atm), and send the control variable value to the process controller. Equipment failure risk analysis may be also used to detect the conditions (features) that may reduce the life of the equipment and generate alerts. For example, the analysis may automatically send an alert to the process monitoring tool indicating that the voltage of a particular semiconductor fabricating chamber reached above 35V, which may increase the likelihood of an electrostatic chuck to fail.

Equipment failure risk analysis involves processing of very large data associated with the operations of the equipments. The equipments may have been in use for a long duration (e.g., several months or even years), and during the use of an equipment, many operational conditions and/or features may have been recorded. For instance, 100s of features may be recorded in every second. A methodology in one embodiment of the present disclosure may distribute the operations data into multiple nodes or servers in a Big Data clustered database based on equipment maintenance history data. In one embodiment, distributed processing in parallel may be performed on selected nodes of a database cluster, for example, for each maintenance record of the maintenance history database. The distributed processing may employ MapReduce operations. In one embodiment, based on the distributed processing, a target data table for failure risk analysis that contains equipment, lifespan of equipment, operations features for failure risk analysis, is constructed. Failure risk analysis may be performed based on the target data table to determine and/or predict equipment failure and/or performance.

FIG. 1 is a flow diagram illustrating a method of performing equipment failure risk detection in one embodiment of the present disclosure. For example, equipment failure risk detection and/or analysis may be performed for equipment operating in industrial processing such as semiconductor manufacturing process. At 102, equipment operations data is distributed to a cluster of servers storing a distributed file system. For example, one or more processors may access equipment operations data and distribute the data over a computer communication network to a cluster of databases. An example of a cluster of databases may include a Hadoop file system or the like. The data may be distributed based on a range of time and operation, for example, specified in maintenance data associated with the equipment.

Figure 2:
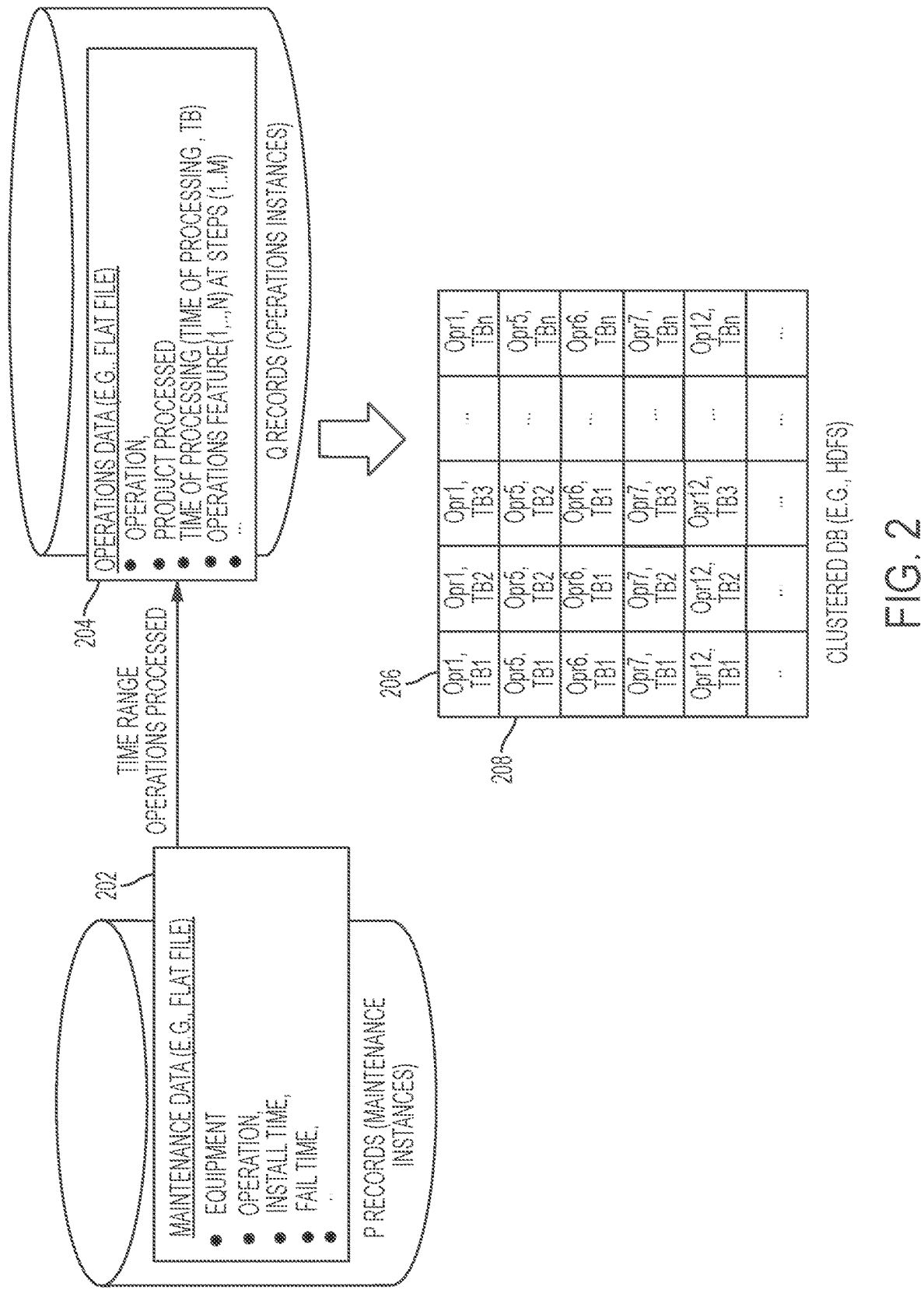
FIG. 2 is a diagram that illustrates distribution of operations data into multiple nodes or servers in clustered database in one embodiment of the present disclosure.

FIG. 2 is a diagram that illustrates distribution of operations data into multiple nodes or servers in clustered database in one embodiment of the present disclosure. Maintenance data 202 may be stored as a flat file structure or another file structure in a storage device, and may include maintenance records (also referred to as P records or maintenance instances) of equipment. A maintenance record or instance may store identification of the equipment, the operation that equipment performed, the installation time of the equipment and the fail time of the equipment. Other information may be stored in the maintenance record. All records of equipment maintenance may be kept as maintenance data 202. Example equipment includes, but is not limited to, electrostatic chuck (ESC) in semiconductor manufacturing process. Operations data or operational data 204 may be stored as a flat file structure in a storage device, and may include equipment operation records. Operations data 204 contains measurement of all features or operational conditions such as temperature, pressure, voltage, current, and/or others, for example, for different time periods for all the instances of operations that involve the equipment of interest such as ESC. For example, an operation instance or record (also referred to as Q record) may store information such as the equipment's operation, the product processed during the operation by or using the equipment, the time of the processing, and operation features, steps or sub-steps of the operation. An example operation may include a processing tool/chamber of semiconductor manufacturing process. An example of product is a semiconductor wafer. Another example operation may include plasma deposition onto a wafer surface. Yet another example operation may include etching. From all the records in the maintenance data, the following parameters may be determined: time bucket, e.g., TB1, TB2, . . . TBn; and operations processed, e.g., opr1, opr5, opr6, opr7, opr12. An example value of a time bucket includes a time range, for example, month1-date1-year1 to month2-date2-year 2. For instance, if a maintenance record indicates that an ESC was used from Jun. 1, 2015 till Feb. 23, 2016, then 9 monthly time bucket of June 2015, July 2015, August 2015, . . . , February 2016, may be considered relevant for the MapReduce operation.

The operations records may be selected from the operations data 204 for the time range and processed operations, and the selected operations records are distributed into a node (or server) of the distributed data structure (e.g., multiple nodes in clustered database (DB)) 206 by the time range (e.g., monthly) and by operations. The distribution of the operations data results in a clustered database of operations data distributed according to time range and operation. For example, each data node or server (e.g., 208) contains multiple records, for example, all instances of the selected operation in the selected time bucket, and all the features recorded for each instance (record). For example, each data node or server (e.g., 208) may store data about one operation or one group of operations. A node (e.g., 208) may be a separate server implementing a distributed file system or database. For example, a node at 208 and a node at 210 may be separate physical servers storing the operations data by different operation and time range.

Referring back to FIG. 1, at 104, from a record entry in the maintenance data, at least an operation performed by the equipment, an installation time the equipment was installed to operate in the industrial process, and a maintenance time of the equipment. The installation time and/or the maintenance time may be specified in dates, for example, by year, month, date. In another aspect, the installation time and/or the maintenance time may be specified in further detailed increment, for example, by year, month, date, and time such as hour, minute, and/or second. The maintenance time of the equipment may include the time (e.g., date and time, or date) the equipment failed to operate and/or the time the equipment was replaced.

At 106, the method may include determining from the cluster of servers, a plurality of servers storing equipment operations data associated with the operation performed by the equipment during a time range between the installation time and the maintenance time. At 108, the plurality of servers is accessed, for example, by connecting to the servers, for instance, if connection has not been established. At 110, a distributed processing operation is executed in each of the plurality of servers to run in parallel. The distributed processing operation computes operation features associated with the equipment, and the operation features are aggregated. An example of the distributed processing operation is the MapReduce operation. In one embodiment, the processing at 104, 106 and 110 are performed for multiple record entries in the maintenance data, for example, for all entries associated with the equipment, for example, so that the distributed processing is performed for the multiple record entries in parallel. At 112, a target table is constructed based on the aggregated operation features.

Figure 3:
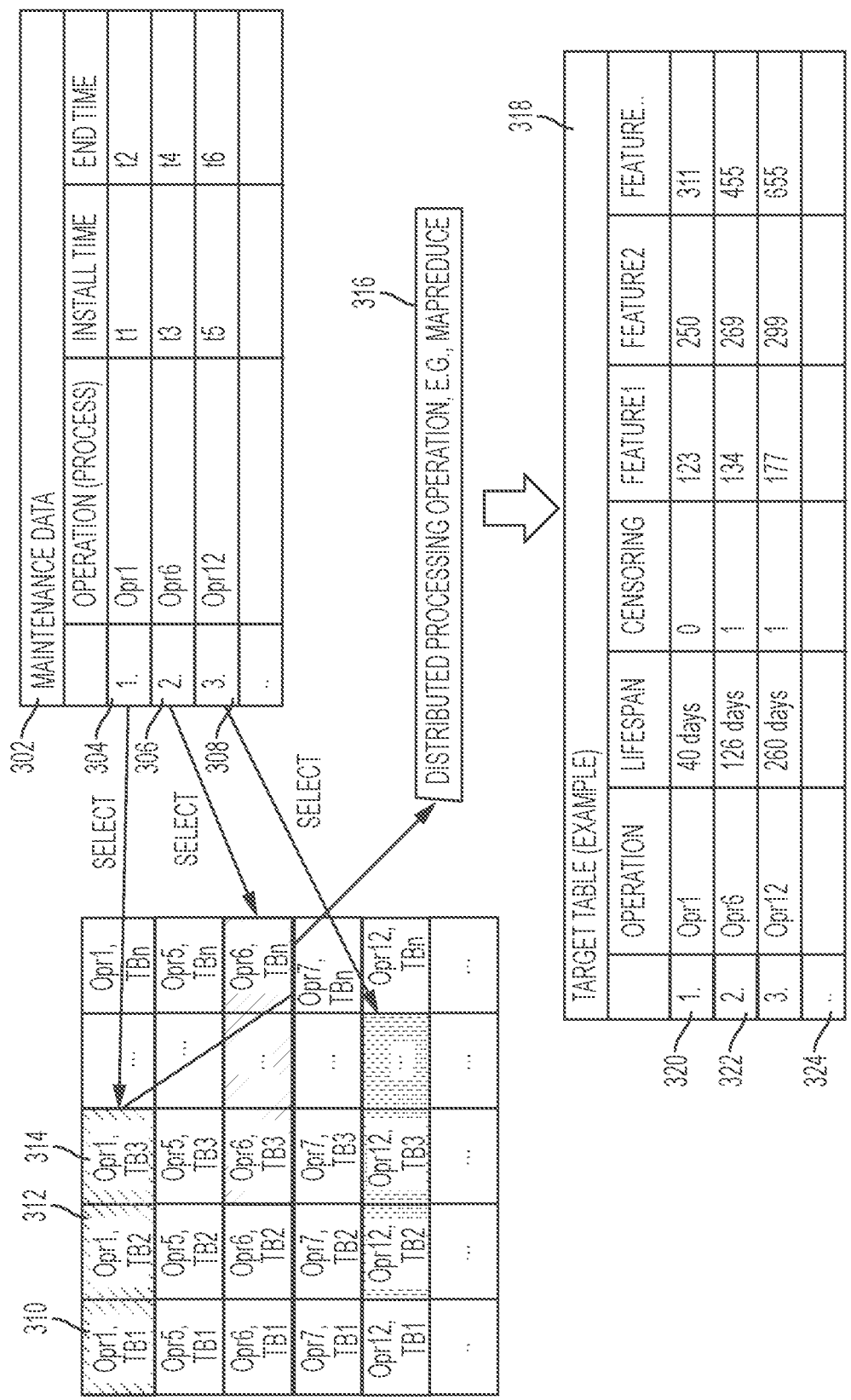
FIG. 3 is a diagram illustrating performing distributed processing of the maintenance record data in one embodiment of the present disclosure.

FIG. 3 is a diagram illustrating distributed processing of the maintenance record data in one embodiment of the present disclosure. The maintenance data 302 may be processed as follows. The maintenance data 302 may include records for equipment, for example, multiple physical instances of the equipment, for example, multiple ESCs in a semiconductor manufacturing process, and for example, contain information about particular equipment that failed and/or replaced. A maintenance record 304 is retrieved for the equipment, and from the record, the operation where the equipment was used and the install date (and/or time) and maintenance date (or time) of the equipment (e.g., when the equipment failed or was replaced), shown as end time in the record entry at 304, are determined. Nodes or servers storing the data associated with the determined operation and time range (e.g., time period between the installation time and the maintenance time) are selected. In the example shown, the nodes at 310, 312, 314 store the data associated with the operation and time range specified in the maintenance record at 304.

The nodes 310, 312, 314 are selected to execute the distributed processing operation, e.g., MapReduce operation on the data in parallel, as shown at 316. The distributed processing operation extracts operation features, which are used to construct a target table. For example, a map operation may computes characteristics such as the average, minimum, maximum, and/or standard deviation values of all the products processed, and of all the operations features at each node (e.g., at 310, 312 and 314). A reduce operation may aggregate the values computed at each node, for example, compute an aggregated characteristics computed at a subset of nodes, e.g., the nodes (e.g., 310, 312 and 314). For example, the map operation may compute an average, minimum, maximum and standard deviation associated with temperature, pressure and power associated with the equipment during the operation, and the reduce operation may aggregate the average, minimum, maximum and standard deviation, computed in the plurality of nodes or servers, associated with temperature, pressure and power associated with the equipment during the operation.

The results of the reduce operation are then used to construct a target table 318. The target table 318 shows an entry at 320 with the resulting aggregated computation performed by the distributed processing operation (e.g., MapReduce) for an operation during a time period associated with the equipment as specified in the maintenance record at 304.

Similarly, maintenance record at 306 is retrieved for the equipment, and from that record, the operation where the equipment was used and the install data and maintenance date of the equipment are determined. Nodes or servers storing the data associated with the determined operation and time range are selected. Those nodes execute the distributed processing operation 316 and the target table 318 is updated with the results 322. Likewise, maintenance record at 308 is retrieved for the equipment, and from that record, the operation where the equipment was used and the install data and maintenance date of the equipment are determined. Nodes or servers storing the data associated with the determined operation and time range are selected. Those nodes execute the distributed processing operation 316 and the target table 318 is updated with the results 324. In one embodiment, the processing of multiple maintenance records is performed in parallel, for example, as distributed parallel processing. Thus, for example, parallel operations may be performed on multiple records, for example, 200 records. In one embodiment, the target table is constructed by adding aggregated operation features computed for each of the multiple entries.

The above-described processing reduces data size in memory and allows for faster processing and detection of equipment risk failure.

The following shows an example of computing features in target maintenance data. For all features, average of all steps in an operation and all products collapsed by products and steps may be computed as follows:

for all features, $i \forall$ {feature1 ... N}, (1)

$$x_i^{avg} = \frac{1}{Nstep} \frac{1}{NProduct} \sum_{j=1}^{Nstep} \sum_{k=1}^{NProduct} x_{i,j,k}$$

For all features, all steps, average of all products (collapsed by products) may be computed as follows:

for all features in all steps, $i \forall$ {feature1. .N}, (2)

$$j \forall \{step0, 1 \ldots M\}, x_{i,j}^{avg} = \frac{1}{NProduct} \sum_{k=1}^{NProduct} x_{i,j,k}$$

Where i=a feature, j=a processing step, k=product processed, Nstep=total number of steps, NProduct=total number of products processed.

The feature calculation may also be performed for minimum, maximum, and or standard deviation. This computation of features for each record of maintenance data may be performed in one embodiment against each node of the operations data. Each node stores smaller size of operations data than before the distribution.

Referring back to FIG. 1, at 114, risk failure analysis for the equipment may be performed based on the operation features stored in the target table. For instance, based on the data in the target table, failure risk analysis may be performed. An example of a failure risk analysis may include a survival analysis such as Cox regression. The Cos regression is described as follows:

Hazard function: $\lambda(t|X) = \lambda_o(t) \exp(\beta_1 X_1 + \ldots + \beta_p X_p)$ The hazard function gives the instantaneous failure rate of an individual conditioned on the fact that the individual survived until a given time. That is:

$$h(t) = -\frac{f(t)}{s(t)}$$

F(t), is cdf (cumulative distribution function), the probability that the survival time is less than or equal to a given point in time, t representing time, f(t) is probability density function.
$\lambda$: hazard function
$\lambda_o$: common baseline hazard function
$X_i$: operations feature i
$\beta_i$: coefficient of operations feature i
Survivor Function
The survivor function is the probability of survival as a function of time. It gives the probability that the survival time of an individual exceeds a defined value. Since the cumulative distribution function, F(t) is the probability that the survival time is less than or equal to a given point in time, the survival function for a continuous distribution, S(t), is the complement of the cumulative distribution function: S(t)=1−F(t).

$S(t) = P(T \geq t) = \exp(-\int_0^t h(u) du) = \exp(-H(t))$

F(t), is cdf, the probability that the survival time is less than or equal to a given point in time, f(t) is probability density function. Hazard function h(t) is the instantaneous conditional probability, P(T≥t), that the failure occurs at time t, given that no failure occurs before t. H(t) is sum of hazard function h(t).

Figure 4:
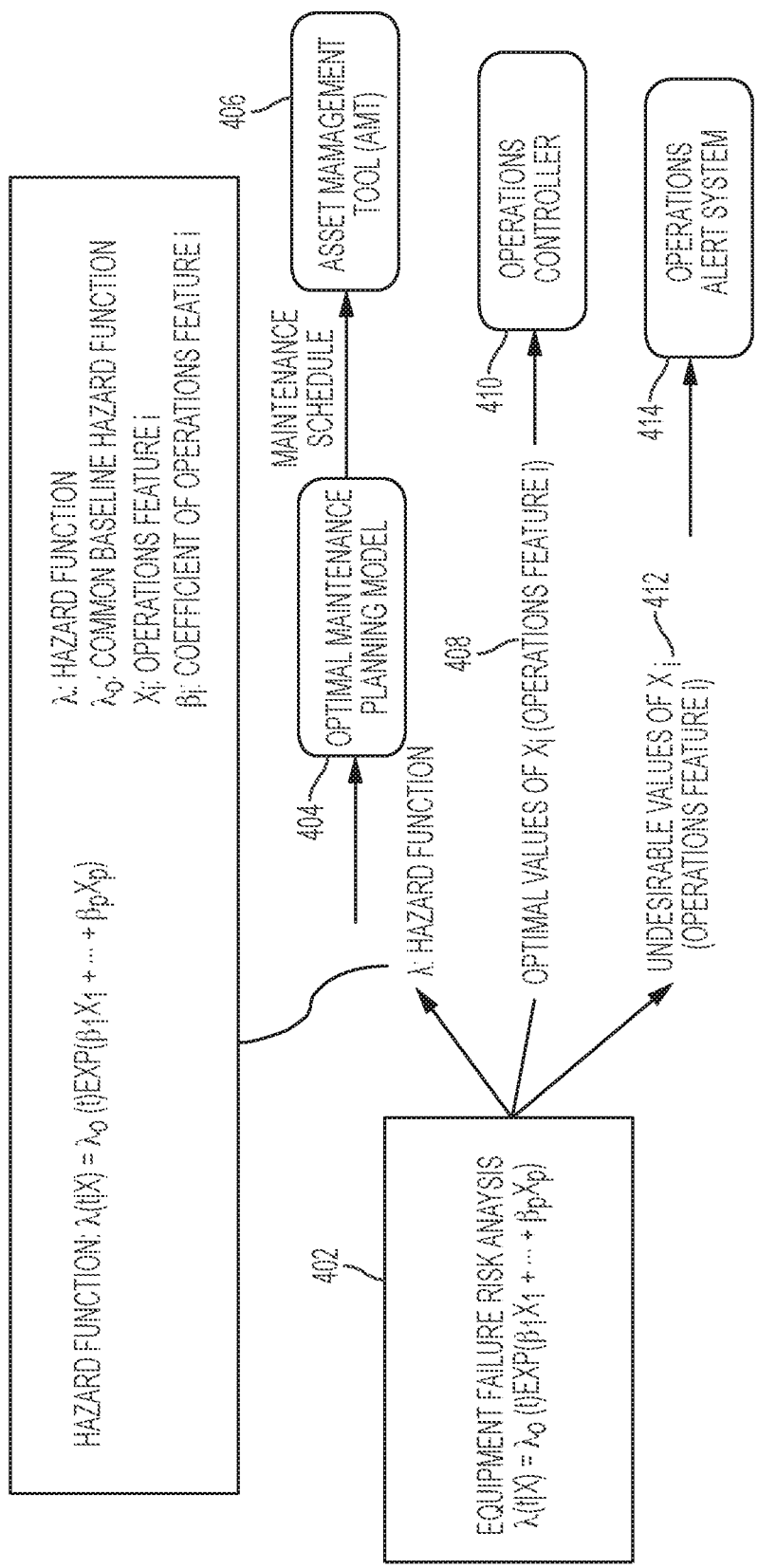
FIG. 4 is a diagram that illustrates equipment failure risk analysis in one embodiment of the present disclosure.

FIG. 4 is a diagram that illustrates equipment failure risk analysis in one embodiment of the present disclosure. At 402, equipment failure risk analysis is performed using a hazard function. The analysis outputs an optimal maintenance planning model at 404. For instance, equipment failure risk analysis in one embodiment may include computing an optimal (e.g., minimum cost) planning of maintenance, for example, computing when to replace and which equipment. For example, the analysis may compute the schedule of maintenance work of electrostatic chuck (ESC) of semiconductor fabricating chamber, e.g., schedule to replace an ESC in 90 days and send the schedule to the asset management tool 406. An asset management may send a notification such as an email to a maintenance system to perform the maintenance work.

At 408, equipment failure risk analysis in one embodiment may optimally set controllable process variables that extend the life of the equipment. For example, the analysis may include computing the desired temperature of semiconductor fabricating chamber (e.g., X degrees Celsius) and pressure (e.g., Y atm). One or more signals comprising the control variable value may be sent to the process controller 410 (also referred to as an operations controller). The process controller 410 includes hardware and sets the temperature and pressure at those values. The one or more signals may automatically cause one or more of the operation features to be adjusted in the industrial process.

Equipment failure risk analysis in one embodiment may detect the conditions (or features) that may reduce the life of the equipment and generate alerts at 412. For example, as a result of the detected conditions, an alert or signal may be sent to the process monitoring tool or an operations alert system 414 indicating that the voltage of semiconductor fabricating chamber #N reached above Z volts (V), which may increase the likelihood of an electrostatic chuck to fail. A signal sent to the operations alert system 414, may cause the operations alert system 414 to automatically adjust the operation features in the industrial process, for example, semiconductor fabricating chamber #N.

Figure 5:
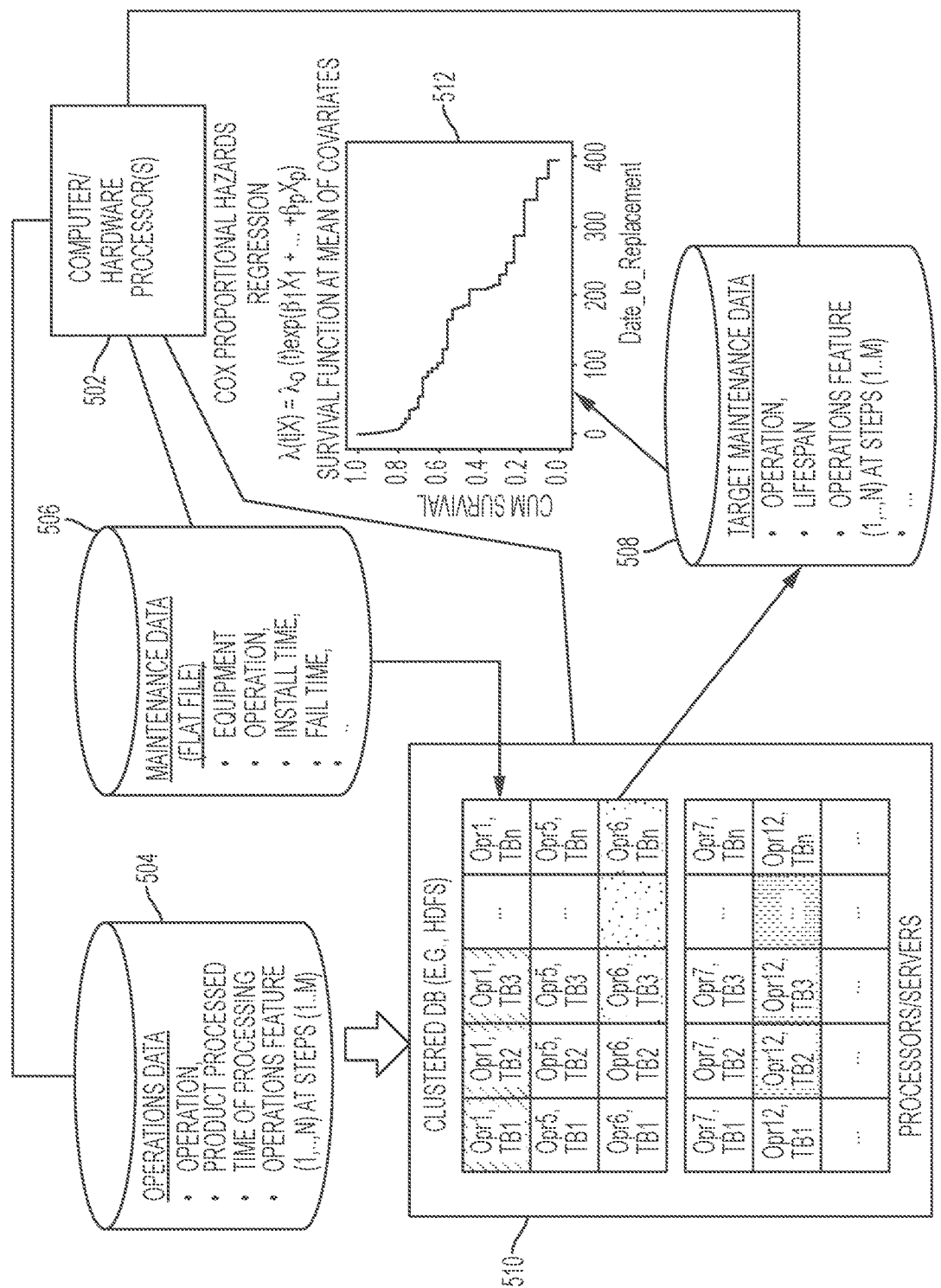
FIG. 5 is a diagram illustrating an overview of components in one embodiment of the present disclosure.

FIG. 5 is a diagram illustrating an overview of components in one embodiment of the present disclosure. One or more processors 502 may be operatively connected to one or more databases (e.g., 504, 506, 508) and a plurality of nodes or server processors implementing a distributed file system 510. Using maintenance data (e.g., range of time, operations) 506, one or more of the processors 502 may distribute the operations data 504 into multiple nodes in clustered DB 510. From each record of maintenance data (e.g., a particular equipment that failed or replaced) 506, one or more of the processors 502 may determine (a) particular operation (process) where the equipment was used, (b) install date and fail (replace) date of the equipment. One or more of the processors 502 may select and connect to the database nodes of the cluster for specific operation and time periods. By invoking distributed processing operation, e.g., MapReduce, operation features (e.g., average, minimum, maximum, standard deviation of temperature, pressure, voltage, current associated with processed operation) are extracted and built into a target data table 508. One or more of the hardware processors 502 may perform failure risk analysis (e.g., survival analysis such as Cox regression) 512, for example, as described with reference to FIG. 4.

Figure 6:
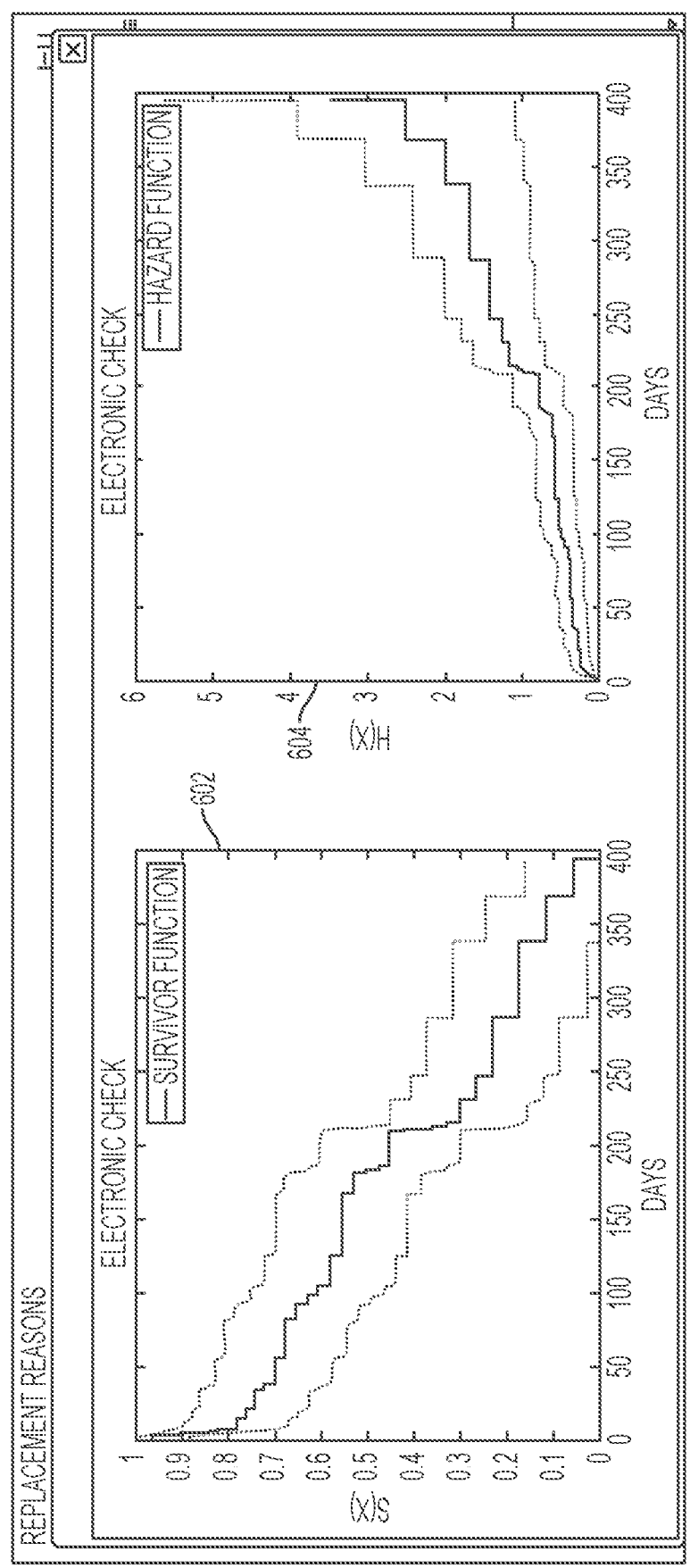
FIG. 6 is a diagram illustrating a user interface that presents graphical charts representing equipment failure risk in one embodiment of the present disclosure.

FIG. 6 is a diagram illustrating a user interface that presents graphical charts representing equipment failure risk in one embodiment of the present disclosure. The charts 602, 604 shows Cox proportional hazard model that explore the relationship between the survival of equipment and operations features.

Figure 7:
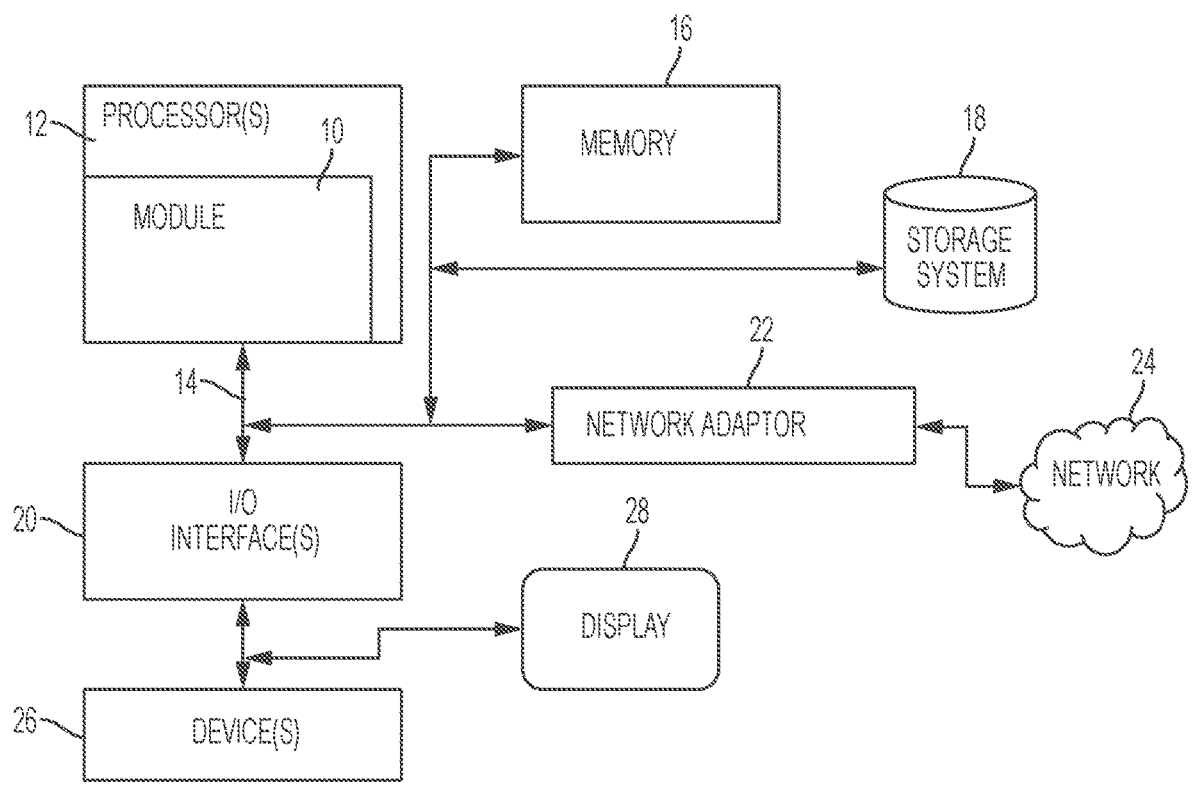
FIG. 7 illustrates a schematic of an example computer or processing system that may implement an equipment failure risk detection system in one embodiment of the present disclosure.

FIG. 7 illustrates a schematic of an example computer or processing system that may implement an equipment failure risk detection system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 7 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A computer-implemented method of detecting equipment failure risk in an industrial process, the method performed by at least one hardware processor, comprising:
    distributing, over a computer communication network, equipment operations data to a cluster of nodes participating in parallel processing and storing a distributed file system, the distributing based on a range of time and operation specified in maintenance data associated with the equipment;
    from a record entry in the maintenance data, determining at least an operation performed by the equipment, an installation time the equipment was installed to operate in the industrial process, and a maintenance time of the equipment;
    determining from the cluster of nodes, a plurality of nodes storing equipment operations data associated with the operation performed by the equipment during a time range between the installation time and the maintenance time;
    constructing a target table based on aggregated operation features determined based on the plurality of nodes executing a distributed processing operation in parallel, the distributed processing operation computing operation features associated with the equipment; and
    performing risk failure analysis of an instance of the equipment based on the aggregated operation features stored in the target table.

2. The method of claim 1, wherein the distributed processing operation comprises a map operation performed by each of the plurality of nodes, the map operation computing at least an average, minimum, maximum and standard deviation associated with temperature, pressure and power associated with the equipment during the operation, and the aggregated operation features are determined by a reduce operation that aggregates at least the average, minimum, maximum and standard deviation computed in the plurality of nodes associated with at least temperature, pressure and power associated with the equipment during the operation.

3. The method of claim 1, wherein the determining of at least an operation performed by the equipment, an installation time the equipment was installed to operate in the industrial process, and a maintenance time of the equipment, the determining from the cluster of nodes, a plurality of nodes storing equipment operations data associated with the operation performed by the equipment during a time range between the installation time and the maintenance time are executed for multiple entries in the maintenance data in parallel as distributed parallel processing, the target table constructed by adding the aggregated operation features computed for each of the multiple entries.

4. The method of claim 1, wherein the equipment comprises a plurality of electrostatic chucks installed in a plurality of semiconductor fabricating chambers.

5. The method of claim 1, wherein the industrial process comprises a semiconductor manufacturing process.

6. The method of claim 1, further comprising:
sending an alert signal based on the risk failure analysis to an operations controller.

7. A computer readable storage medium storing a program of instructions executable by a machine to perform a method of detecting equipment failure risk in an industrial process, the method comprising:

distributing, over a computer communication network, equipment operations data to a cluster of nodes storing a distributed file system, the distributing based on a range of time and operation specified in maintenance data associated with the equipment;

from a record entry in the maintenance data, determining at least an operation performed by the equipment, an installation time the equipment was installed to operate in the industrial process, and a maintenance time of the equipment;

determining from the cluster of nodes, a plurality of nodes storing equipment operations data associated with the operation performed by the equipment during a time range between the installation time and the maintenance time;

constructing a target table based on aggregated operation features determined based on the plurality of nodes executing a distributed processing operation in parallel, the distributed processing operation computing operation features associated with the equipment; and performing risk failure analysis of an instance of the equipment based on the aggregated operation features stored in the target table.

8. The computer readable storage medium of claim 7, wherein the distributed processing operation comprises a map operation performed by each of the plurality of nodes, the map operation computing at least an average, minimum, maximum and standard deviation associated with temperature, pressure and power associated with the equipment during the operation, and the aggregated operation features are determined by a reduce operation that aggregates at least the average, minimum, maximum and standard deviation computed in the plurality of nodes associated with at least temperature, pressure and power associated with the equipment during the operation.

9. The computer readable storage medium of claim 7, wherein the determining of at least an operation performed by the equipment, an installation time the equipment was installed to operate in the industrial process, and a maintenance time of the equipment, the step of determining from the cluster of nodes, a plurality of nodes storing equipment operations data associated with the operation performed by the equipment during a time range between the installation time and the maintenance time, are executed for multiple entries in the maintenance data in parallel as distributed parallel processing, the target table constructed by adding the aggregated operation features computed for each of the multiple entries.

10. The computer readable storage medium of claim 7, wherein the equipment comprises a plurality of electrostatic chucks installed in a plurality of semiconductor fabricating chambers.

11. The computer readable storage medium of claim 7, wherein the industrial process comprises a semiconductor manufacturing process.

12. The computer readable storage medium of claim 7, further comprising:
sending a signal based on the risk failure analysis to an operations controller.

13. The computer readable storage medium of claim 7, wherein the equipment comprises a plurality of electrostatic chucks installed in a plurality of semiconductor fabricating chambers, and wherein the industrial process comprises a semiconductor manufacturing process, wherein adjusting of an operating condition associated with the equipment running in the industrial process comprises automatically adjusting at least one of temperature and pressure in one or more of the plurality of semiconductor fabricating chambers.

14. A system of detecting equipment failure risk in an industrial process, comprising:

at least one hardware processor communicatively coupled to a cluster of nodes storing a distributed file system;

the at least one hardware processor operable to distribute, over a computer communication network, equipment operations data to the cluster of nodes storing a distributed file system, the distributing based on a range of time and operation specified in maintenance data associated with the equipment;

the at least one hardware processor further operable to, from a record entry in the maintenance data, determine at least an operation performed by the equipment, an installation time the equipment was installed to operate in the industrial process, and a maintenance time of the equipment;

the at least one hardware processor further operable to determine from the cluster of nodes, a plurality of nodes storing equipment operations data associated with the operation performed by the equipment during a time range between the installation time and the maintenance time;

the at least one hardware processor further operable to construct a target table based on aggregated operation features determined based on the plurality of nodes executing a distributed processing operation in parallel, the distributed processing operation computing operation features associated with the equipment;

the at least one hardware processor further operable to perform risk failure analysis of an instance of the equipment based on the aggregated operation features stored in the target table; and the at least one hardware processor further operable to, based on the risk failure analysis, adjust an operating condition associated with the equipment running the industrial process.

15. The system of claim 14, wherein the distributed processing operation comprises a map operation performed by each of the plurality of nodes, the map operation computing at least an average, minimum, maximum and standard deviation associated with temperature, pressure and power associated with the equipment during the operation, wherein the aggregated operation features are determined by a reduce operation operable to aggregate at least the average, minimum, maximum and standard deviation computed in the plurality of nodes associated with at least temperature, pressure and power associated with the equipment during the operation.

16. The system of claim 14, wherein the at least one hardware processor determines at least an operation performed by the equipment, an installation time the equipment was installed to operate in the industrial process, and a maintenance time of the equipment, determines from the cluster of nodes, a plurality of nodes storing equipment operations data associated with the operation performed by the equipment during a time range between the installation time and the maintenance time, for multiple entries in the maintenance data in parallel as distributed parallel processing, the target table constructed by adding the aggregated operation features computed for each of the multiple entries.

17. The system of claim 14, wherein the equipment comprises a plurality of electrostatic chucks installed in a plurality of semiconductor fabricating chambers.

18. The system of claim 14, wherein the industrial process comprises a semiconductor manufacturing process.

19. The system of claim 14, wherein the at least one hardware processor is further operable to send a signal based on the risk failure analysis to an operations controller.

20. The system of claim 14, wherein the equipment comprises a plurality of electrostatic chucks installed in a plurality of semiconductor fabricating chambers, and wherein the industrial process comprises a semiconductor manufacturing process, wherein the adjusting of an operating condition associated with the equipment running in the industrial process comprises automatically adjusting at least one of temperature and pressure in one or more of the plurality of semiconductor fabricating chambers.

* * * * *